(12) United States Patent
Fry

(10) Patent No.: US 6,981,529 B2
(45) Date of Patent: Jan. 3, 2006

(54) MEASURING CATALYST(S) FOR FILLING REACTOR TUBES IN REACTOR VESSELS

(75) Inventor: Paul Fry, League City, TX (US)

(73) Assignee: Catalyst Services, Inc., La Porte, TX (US)

( * ) Notice: Subject to any disclaimer, the term of this patent is extended or adjusted under 35 U.S.C. 154(b) by 121 days.

(21) Appl. No.: 10/609,081

(22) Filed: Jun. 27, 2003

(65) Prior Publication Data

US 2004/0017875 A1   Jan. 29, 2004

Related U.S. Application Data

(60) Provisional application No. 60/392,750, filed on Jun. 28, 2002.

(51) Int. Cl.
*B65B 1/04* (2006.01)

(52) U.S. Cl. .............................. 141/67; 141/83; 141/72
(58) Field of Classification Search ................. 141/67, 141/72–74, 83, 286; 222/55, 77; 414/160, 414/586, 588, 800–806
See application file for complete search history.

(56) References Cited

U.S. PATENT DOCUMENTS

| | | | | |
|---|---|---|---|---|
| 4,402,349 A | * | 9/1983 | Engert et al. | 141/9 |
| 4,402,643 A | * | 9/1983 | Lytton et al. | 414/160 |
| 4,461,327 A | * | 7/1984 | Magin et al. | 141/1 |
| 5,890,868 A | | 4/1999 | Comardo | |
| 5,897,282 A | | 4/1999 | Comardo | |
| 6,132,157 A | | 10/2000 | Comardo | |

* cited by examiner

*Primary Examiner*—Steven O. Douglas
(74) *Attorney, Agent, or Firm*—Mark A. Oathout

(57) ABSTRACT

A plurality of reactor tubes contained in a reactor vessel are filled with at least one catalyst by automatically measuring the catalyst by weight with equipment located at the site of the reactor vessel, and dispensing the measured catalyst into a plurality of reactor tubes.

4 Claims, 3 Drawing Sheets

MEASURING CATALYST(S) FOR FILLING REACTOR TUBES IN REACTOR VESSELS

CROSS-REFERENCE TO RELATED APPLICATIONS

This application claims the benefit of U.S. provisional application No. 60/392,750 filed Jun. 28, 2002.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Description of the Related Art

Refer to the "Background of the Invention" section and other sections of U.S. Pat. No. 5,897,282, which is incorporated herein by reference, for general information concerning techniques and apparatus used to fill reactor tubes in catalyst reactor vessels with catalyst material(s).

Various techniques have been used in the past to load catalyst into reactor tubes. One method filled tubes by volume. However, reactor tubes filled with equal volumes of catalyst may have a five percent to ten percent variance in weight (e.g. a thirty to forty gram variance) between the actual catalyst contained in respective tubes. Another prior method pre-measured catalyst by weight and individually sealed each measured amount into a resealable plastic bag at an off-reactor-site location. The plastic bags were then transported by drum to the worksite for loading into multi-compartment tube loaders or into reactor tubes. Once at the worksite, the drums were opened and bags removed for loading, e.g. ten bags at a time into tube loaders. This technique is very laborious as it may call for the pre-bagging of 100's of thousands of bags prior to arriving at the worksite followed by unbagging at the worksite. In another technique, individual quantities of catalyst were weighed by hand and then collected by hand for loading into a reactor tube. Last, in another technique which was learned about through secondhand conversations, it is believed BASF used a hopper to feed catalyst to a scaling belt conveyor, which led to a single tube, which was used to feed catalyst directly into a reactor tube. This device only filled one reactor tube at a time, and it was described as being slow.

BRIEF SUMMARY OF THE INVENTION

A plurality of reactor tubes contained in a reactor vessel are filled with at least one catalyst by automatically measuring the catalyst by weight with equipment located at the site of the reactor vessel, and dispensing the measured catalyst into a plurality of reactor tubes. The system improves efficiency, and saves time and wasted catalyst.

DETAILED DESCRIPTION OF THE INVENTION

Figure 1:
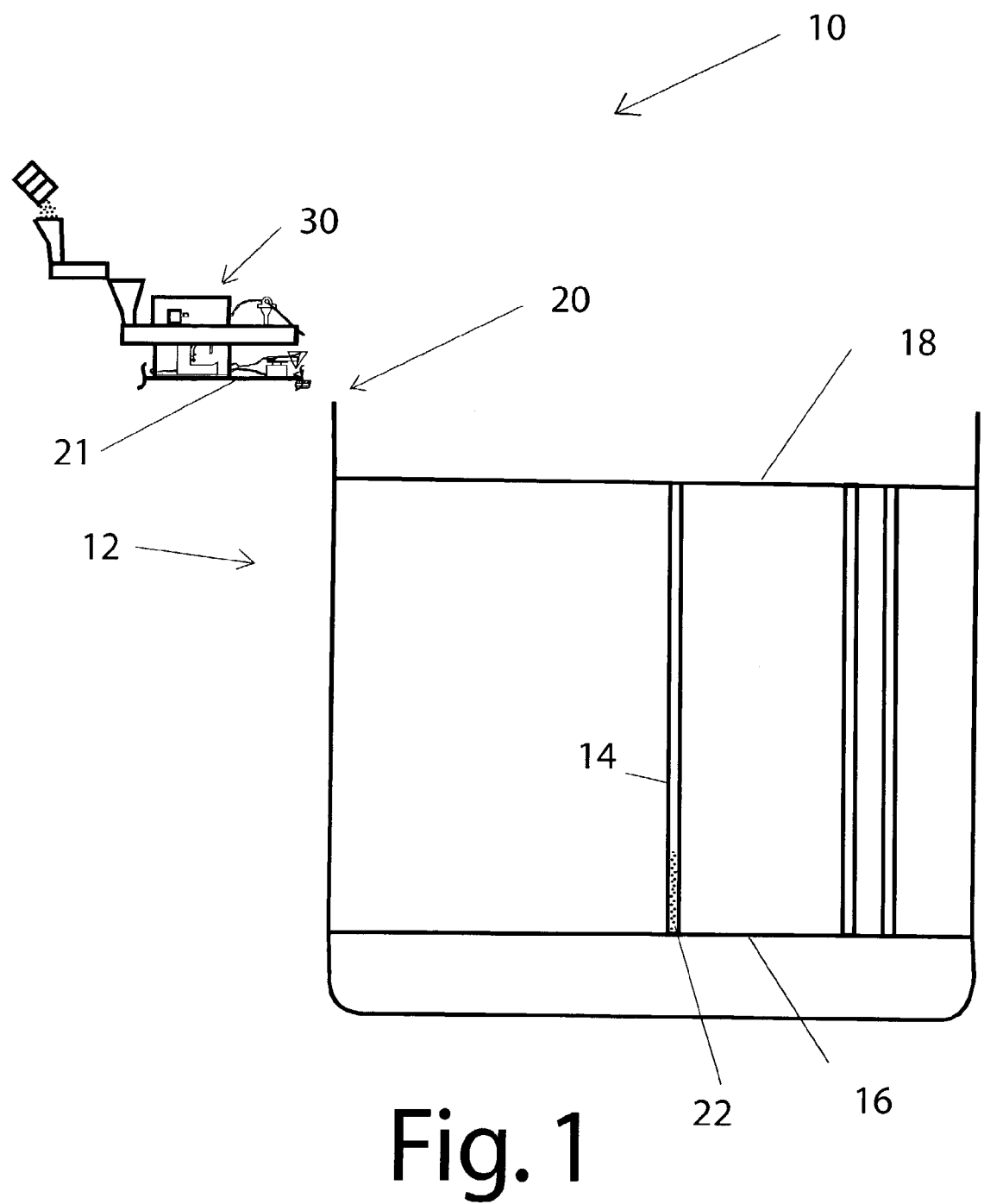
FIG. 1 is a schematic view of a reactor vessel worksite.

Referring to FIG. 1, a reactor vessel worksite 10 is schematically shown. The reactor vessel 12 contains a plurality of reactor tubes 14. The reactor tubes 14 extend vertically in the axial direction. One end of each reactor tube 14 is connected to a lower tube sheet 16 and the other end is connected to an upper tube sheet 18. The reactor vessel 12 has an opening, entryway or removable head 20 to expose the upper tube sheet 18. From the upper tube sheet 18, each reactor tube 14 is designed to be filled with catalyst material(s) 22 for the purpose of carrying out the reaction.

A bulk catalyst material(s) 24 which may or may not be pre-mixed is delivered to the worksite location 10 for the reactor vessel 12. The bulk catalyst material(s) 24 may be delivered, for example, in a drum 26. Next, the material(s) is/are transferred to an automated device for feeding and measuring the bulk catalyst material(s) 30 which may be mounted on a platform 21. The automated device 30 can be made to fill multiple reactor tubes 14 at the same time or one reactor tube 14 at a time. The bulk catalyst material(s) 24 is/are measured by weight. After a desirable weight has been measured, the resulting quantity of the measured catalyst 28 is separately dispensed. Additional desirable weight quantities of the catalyst may be measured and separately dispensed. Weight measurements for each quantity may be performed simultaneously, sequentially, or part simultaneously and part sequentially. Each separate measured quantity of the catalyst 28 is dispensed into an individual reactor tube 14.

The process described in the preceding paragraph can be repeated for additional or different bulk catalyst material(s) 24 to be placed on top of the initial quantity of catalyst which has been loaded into a reactor tube 14.

Figure 2:
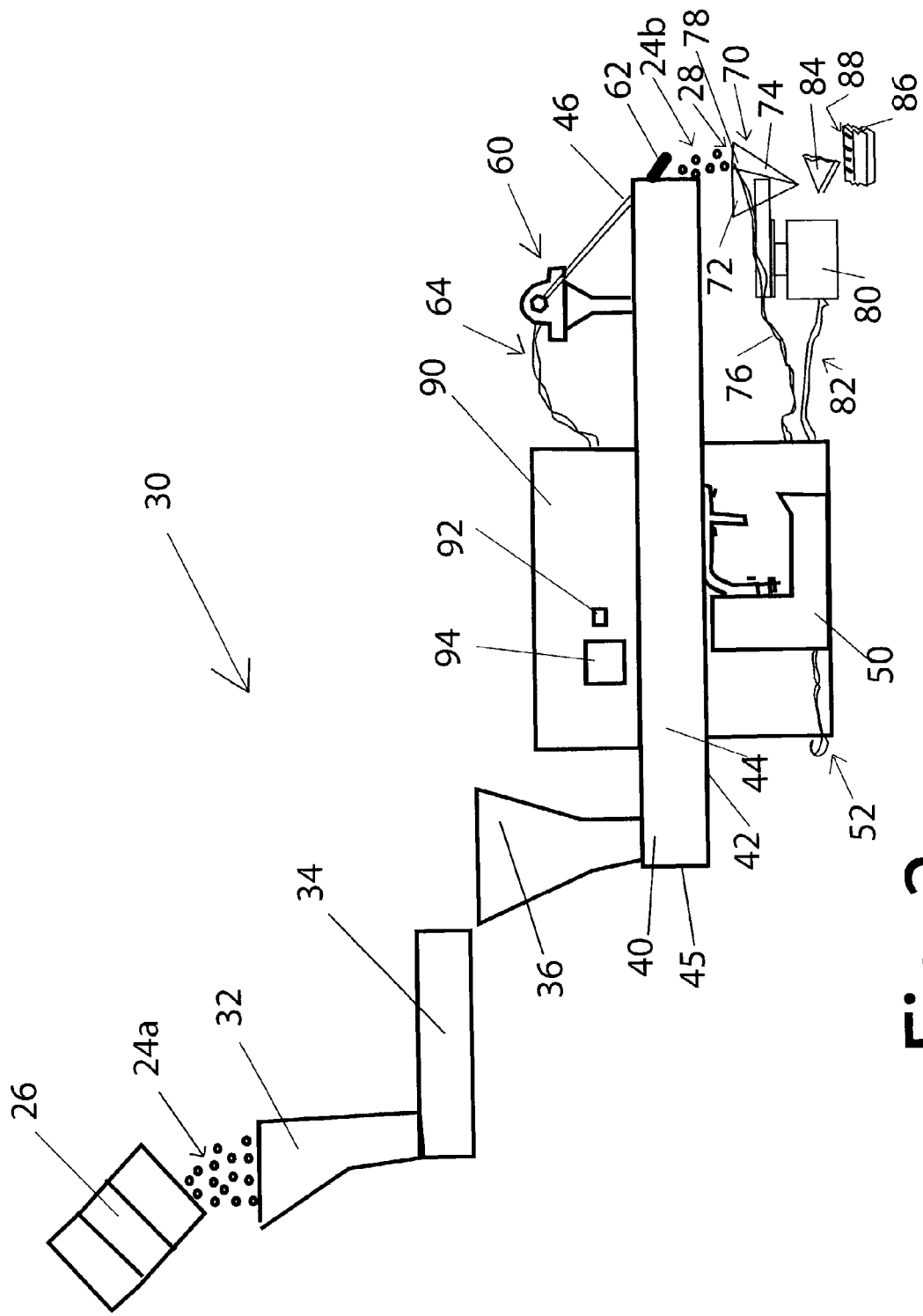
FIG. 2 is an elevation view of a device for feeding and weighing catalyst.

Referring to FIG. 2, one embodiment of the automated (self-acting/operating/regulated/controlled) device for feeding and measuring the bulk catalyst material(s) 30 is shown. This embodiment generally includes a feed hopper 32 (optional), a feed trough 34 (optional), a main hopper 36, a vibrating trough 40, a vibrating motor 50, a gate mechanism 60, a catalyst dispenser 70, a scale 80 and a computer 90.

A drum 26 or other device is used to transfer bulk catalyst material(s) 24a to the automated device for feeding and measuring the bulk catalyst material(s) 30. The drum 26 may be mounted above the feed hopper 32, the feed trough 34, or the main hopper 36. If the feed hopper 32 is incorporated into the system, it will feed catalyst materials onto the feed trough 34. The feed trough 34 (such troughs are commercially available with a screening device in the trough), if incorporated, is used to screen broken pieces, dust, etc. and is used to feed (by vibration, gravity, etc.) catalyst materials to the main hopper 36. The main hopper 36 is mounted above and feeds catalyst material(s) onto the vibrating trough 40 in a uniform manner (such hoppers 36 with uniform feed outlets are commercially available). The feeding of the catalyst material(s) onto the vibrating trough 40 in a uniform manner keeps unwanted weight off of the vibrating trough 40, i.e., it prevents the build-up of a load within vibrating trough 40 of catalyst having excessive weight.

The vibrating trough 40 may have a flat base 42 with two sidewalls 44 (one shown). One or more vibrating motors 50 (preferably variable speed) are connected to the lower side of the vibrating trough 40. As a catalyst material 24 is fed onto the flat base 42, the vibrating motor 50 shakes the vibrating trough 40. This functions to feed/move the catalyst material (or materials) 24b along the vibrating trough 40 and divaricates the catalyst material on the flat base 42 as it moves along the trough. The vibrating trough 40 may have a slight decline in altitude from the entering end 45 to the exiting end 46. The vibrating trough 40 may be replaced by some other device for moving the catalyst, such as, for example, a belt conveyor or other type of conveyor. The vibrating motor 50 includes control lines 52 which run to the computer 90. The computer 90 determines when and how much to vibrate the vibrating trough 40 via the vibrating motor 50.

A gate mechanism 60 is mounted over the exiting end 46 of the vibrating trough 40. The gate mechanism 60 includes a brush 62 or other device such as, for example, a catch or flapper (not shown). The gate mechanism 60 also includes control lines 64 which run to the computer 90 and to a power source. The computer 90 determines when the brush 62 is lifted (open) and when it is lowered (closed). When lifted, catalyst material 24b may be moved/vibrated off of the exiting end 46 of the vibrating trough 40.

A catalyst dispenser 70 is mounted below the exiting end 46 of the vibrating trough 40. The catalyst dispenser 70 collects catalyst material 24b moved/vibrated off of the exiting end 46 of the vibrating trough 40. Moreover, the catalyst dispenser 70 is used to weigh the catalyst material 24b which is collected. This may be accomplished by a scale 80 or load cell device connected to the catalyst dispenser 70. Control lines 82 run from the scale 80 to the computer 90. The computer 90 determines/measures the weight of the catalyst collected in the catalyst dispenser 70 and integrates this data with data for operating the vibrating motor 50 and for opening or closing the gate mechanism 60. More than one quantity of catalyst can be weighed at the same time using multiple catalyst dispensers 70 each paired with a scale 80.

The catalyst dispenser 70 may be a dump bucket 72 which may or may not pivot. The catalyst dispenser 70 could also include, for example, a door mechanism 74, etc. for dispensing the measured catalyst. Control lines 76 may be used to automate the door mechanism 74 via a pivot point 78.

The catalyst dispenser 70 is used for dispensing a measured quantity of catalyst 22 into a reactor tube 14. This may be accomplished in a variety of ways, such as, for example, by dispensing each measured quantity of catalyst (one or more quantities of catalyst can be measured at the same time) into a funnel (or funnels) 84 which feeds such measured quantity into a transfer cassette (or cassettes) 86 having a plurality of catalyst loading compartments 88 (e.g. five or ten compartments) and used to hold catalyst by weight (similar to a transfer cassette commercially available from Bulk Material Equipment of Houston, Tex. which is used to hold catalyst by volume), by dispensing each measured quantity of catalyst into a storage bag, by dispensing each measured quantity of catalyst into a device (not shown) for transferring catalyst directly into reactor tubes 14, etc. The transfer cassette(s) 86 are currently preferred and are then taken to, for example, multi-tube loaders (not shown) which load catalyst into a reactor, a funnel, etc.

The computer 90 preferably includes a user interface such as a keypad 92 and display screen 94. The keypad 92 may be used to enter operational parameters such as the target weight for each measured quantity of catalyst 24b, the measurement rate or time allotted to measure each successive quantity of measured catalyst (e.g. ten to twenty measurements/compartments per minute), and/or allowable/desirable variance between each successive quantity of measured catalyst to be dispensed into a reactor tube 14. Presently, it is recommended to have less than a three gram variation (preferably less than a one gram variation) between each measured quantity of like catalyst to be loaded into respective reactor tubes 14 (although the allowable variation may depend upon the job being performed as would be known to one of ordinary skill in the art, e.g., the weight and size of the individual catalyst particles depends upon the job being performed and would affect the allowable variation between each measured quantity). The display screen 94 may display by way of example, the production weight target, the actual weight of each successive measured quantity, the running speed, an average of weights, and/or the allowable variance between the target weight and each successive measured weight. Generally, the computer 90 may slow down the vibrating motor 50 and hence the rate of catalyst 24b falling into the catalyst dispenser 70 as the actual weight approaches the target weight. This slow down process may be dependent upon the allowable variance in weight. The accuracy of the measurements may also increase with each successive production of a measured quantity as the computer 90 can calibrate the system based upon prior readings of, for example, the actual weight versus the target weight while incorporating prior data on the vibration rate and amplitude, gate open time, accounting for drop distance and particles falling through the air after the signal is sent to close the gate, etc.

Figure 3:
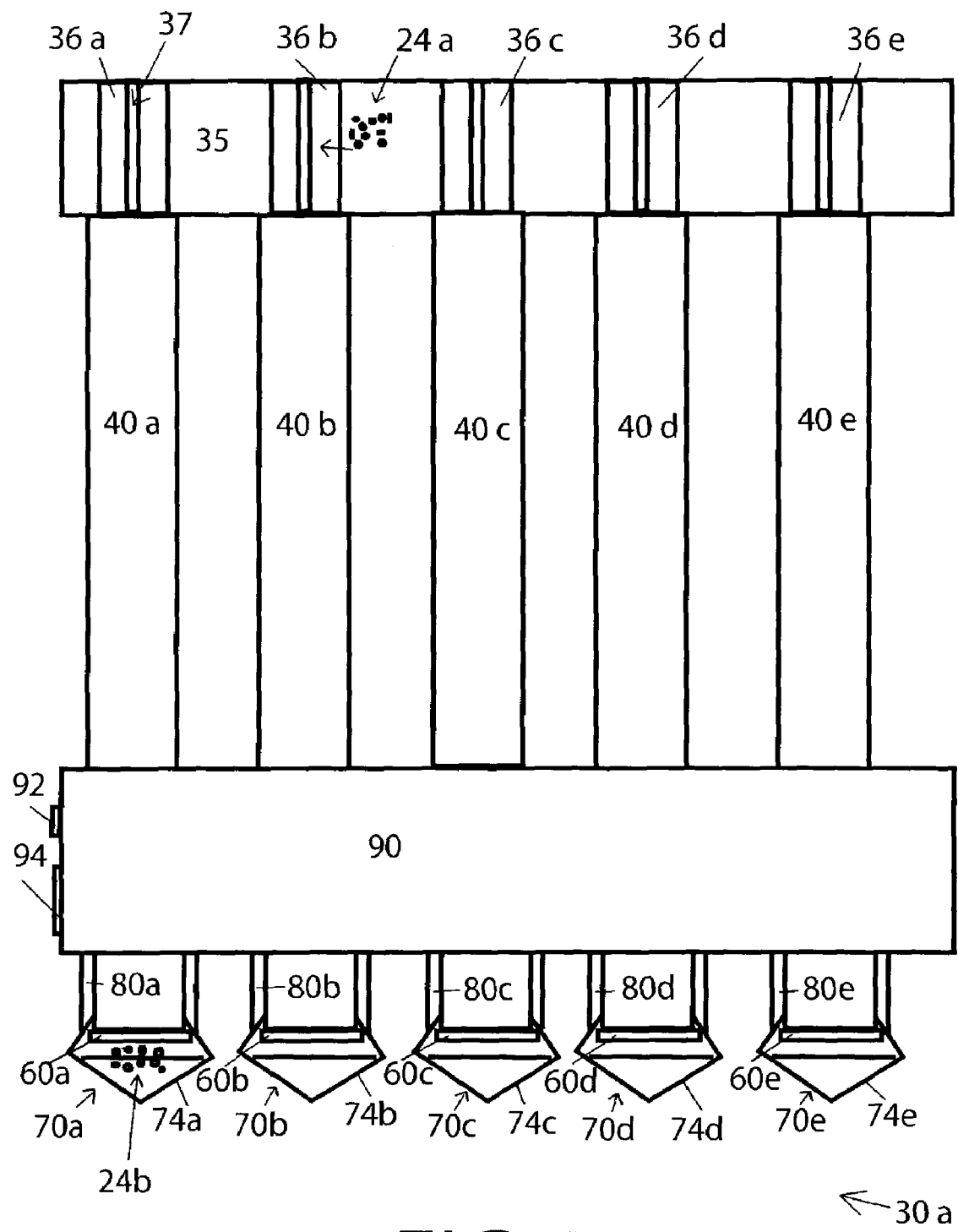
FIG. 3 is a top view of a five lane device for feeding and weighing catalyst.

Referring to FIG. 3, a five lane embodiment of the automated (self-acting/operating/regulated/controlled) device for feeding and measuring the bulk catalyst material(s) 30a is shown. The automated device for feeding and measuring the bulk catalyst material(s) 30a is normally set-up at the reactor vessel worksite 10 (depicted in FIG. 1). This embodiment generally includes a hopper trough 35, five main hoppers 36a–e, five vibrating troughs 40a–e, five vibrating motors (hidden but similar to as shown in FIG. 2), five gate mechanisms 60a–e, five catalyst dispensers 70a–e, five scales 80a–e and a computer 90. This embodiment may be used to measure and fill twenty to forty compartments 88 (FIG. 2) per minute, however such is somewhat dependent upon the size and weight characteristics of the catalyst being used. By way of example, this embodiment could be used to load a transfer cassette 86 having ten catalyst loading compartments 88 in series by loading every other compartment on a fist run, next shifting/sliding the transfer cassette 86 to align the five remaining empty compartments 88 under the device 30a, and then loading the five remaining compartments 88.

Catalyst 24a is fed to each of the main hoppers 36a–e by the hopper trough 35. and passes down through openings 37 onto the five lanes of vibrating troughs 40a–e. The vibrating troughs may each be mounted on independent scales 80a–e. Catalyst dispensers 70a–e are mounted below the exit and gate mechanisms 60a–e of the respective vibrating troughs 40a–e. The catalyst dispensers 70a–e collect catalyst material 24b moved/vibrated off of the respective vibrating troughs 40a–e. Moreover, the catalyst dispensers 70a–e are used to weigh the catalyst material 24b which is collected. This may be accomplished by respective scales 80a–e or load cell devices connected to the catalyst dispensers 70a–e. Control lines 82 similar to as shown in FIG. 2 run from each of the scales 80a–e to the computer 90. The computer 90 determines/measures the weight of the catalyst collected in each of the catalyst dispensers 70a–e (preferably independently) and integrates this data with data for operating the five separate vibrating motors 50 (similar to as shown in FIG. 2) and for opening or closing the gate mechanisms 60a–e. As discussed above with respect to FIG. 2, each of the gate mechanisms 60a–e preferably has a brush tip 62 to enhance the closing of the gate mechanisms 60a–e against falling particles of the catalyst material 24b. Preferably the computer 90 determines/measures the weight of the catalyst collected in each of the catalyst dispensers 70a–e independently and closes each respective gate mechanism 60a–e independently in response to the separate computations.

Some data resulting from test runs of the automated devices for feeding and measuring the bulk catalyst material(s) 24a is reproduced below as an example of successive measurements by weight of catalyst which are achieved by the equipments:

| TARGET WT. 453 GRAMS (BRUSH) 15 PER MINUTE & 5 PER SECOND | | TARGET WT. 908 GRAMS (METAL FLAPPER) 14.5 PER MINUTE 4 PER SECOND | |
|---|---|---|---|
| 1 | 452.5 | 1 | 906.5 |
| 2 | 452 | 2 | 907.5 |
| 3 | 463 | 3 | 909.5 |
| 4 | 462 | 4 | 906.5 |
| 5 | 452 | 5 | 906 |
| 6 | 452.5 | 6 | 907 |
| 7 | 452 | 7 | 906.5 |
| 8 | 453.5 | 8 | 908 |
| 9 | 451 | 9 | 906.5 |
| 10 | 453.5 | 10 | 905 |
| 11 | 456.5 | 11 | 911 |
| 12 | 459.5 | 12 | 910.5 |
| 13 | 453.5 | 13 | 905.5 |
| 14 | 453 | 14 | 906.5 |
| 15 | 453.5 | 15 | 909 |
| 16 | 453.5 | 16 | 905.5 |
| 17 | 453.5 | 17 | 909 |
| 18 | 454.5 | 18 | 907 |
| 19 | 454.5 | 19 | 907 |
| 20 | 455.5 | 20 | 908 |
| 21 | 456 | 21 | 905 |
| 22 | 454 | 22 | 905 |
| 23 | 454 | 23 | 905.5 |
| 24 | 455.5 | 24 | 905.5 |
| 25 | 454.5 | 25 | 909 |
| 26 | 454 | | |
| 27 | 455 | | |
| Total weight | 12274.5 | | 22678 |
| Average weight | 454.6 | | 907.12 |
| Low weight | 452.5 | | 905 |
| High weight | 463 | | 911 |

Various changes may be made to the embodiment described without departing from the spirit of the invention claimed. For example, multiple automated devices for feeding and measuring the bulk catalyst material(s) 30 may be combined to form, for example, two simultaneous five lane loaders to make a ten lane loader; or a plurality of vibrating troughs 40 may be interconnected to form a multi-channel vibrating trough 40. It is to be understood, however, that the loader is not limited to two, five or ten lanes (it could be more or less lanes). The transfer cassette 86 may also be automated to move with respect to the catalyst dispenser 70. In this manner, a single scale 80 and catalyst dispenser 70 may perform automated filling of all compartments 88 in a transfer cassette 86. The automated device for feeding and measuring the bulk catalyst material(s) 30 allows such to be accomplished quickly, i.e., at speeds greater than one compartment 88 (and hence one reactor tube 14) per minute, and up to speeds of ten to twenty compartments 88 (and hence reactor tubes 14) per minute or greater. This is a significant advantage over the prior art and is critical to making measurement by weight an improvement over the prior art. The system may also incorporate photo eyes for viewing catalyst to adjust the feed, and can control the feed rate of the hoppers 32, 36. The system has the advantages over prior systems of being cleaner, more accurate in terms of dispensing the proper and uniform amounts of catalyst 22 into the reactor tubes 14, operationally faster, and decreasing spillage.

What is claimed is:

1. An apparatus for filling a plurality of reactor tubes contained in a reactor vessel with at least one catalyst, comprising:
    a hopper;
    a catalyst moving device mounted below the hopper wherein the catalyst moving device comprises a trough having one open end and a vibrating motor attached to the trough;
    a catalyst dispenser mounted below the catalyst moving device;
    a scale attached to the catalyst dispenser;
    a computer in communication with the scale, the catalyst moving device and with the catalyst dispenser; and
    a gate mechanism mounted over the open end of the trough and in communication with the computer wherein the gate mechanism has a brush.

2. The apparatus according to claim 1 wherein the catalyst dispenser includes a door mechanism.

3. An apparatus for filling a plurality of reactor tubes contained in a reactor vessel with at least one catalyst, comprising:
    a hopper;
    a catalyst moving device mounted below the hopper wherein the catalyst moving device comprises a trough having open end and a vibrating motor attached to the trough;
    a catalyst dispenser mounted below the catalyst moving device;
    a scale attached to the catalyst dispenser; and
    a computer in communication with the scale, the catalyst moving device and with the catalyst dispenser;
    a gate mechanism mounted over the open end of the trough and in communication with the computer wherein the gate mechanism has a brush;
    a second hopper;
    a second trough mounted below the second hopper, the second trough having one open end;
    a second vibrating motor attached to the second trough;
    a second gate mechanism mounted over the open end of the second trough wherein the second gate mechanism has a second brush;
    a second catalyst dispenser mounted below the second trough and the second gate mechanism;
    a second scale attached to the catalyst dispenser; and
    wherein the computer is in communication with the second scale, the second vibrating motor and the second gate mechanism.

4. The apparatus according to claim 3 wherein the catalyst dispenser includes a door mechanism and wherein the second catalyst dispenser includes a second door mechanism.

* * * * *